June 3, 1947.  H. E. HAYNES  2,421,560
DIFFERENTIAL VOLTAGE CONTROL SYSTEM
Filed Sept. 3, 1943
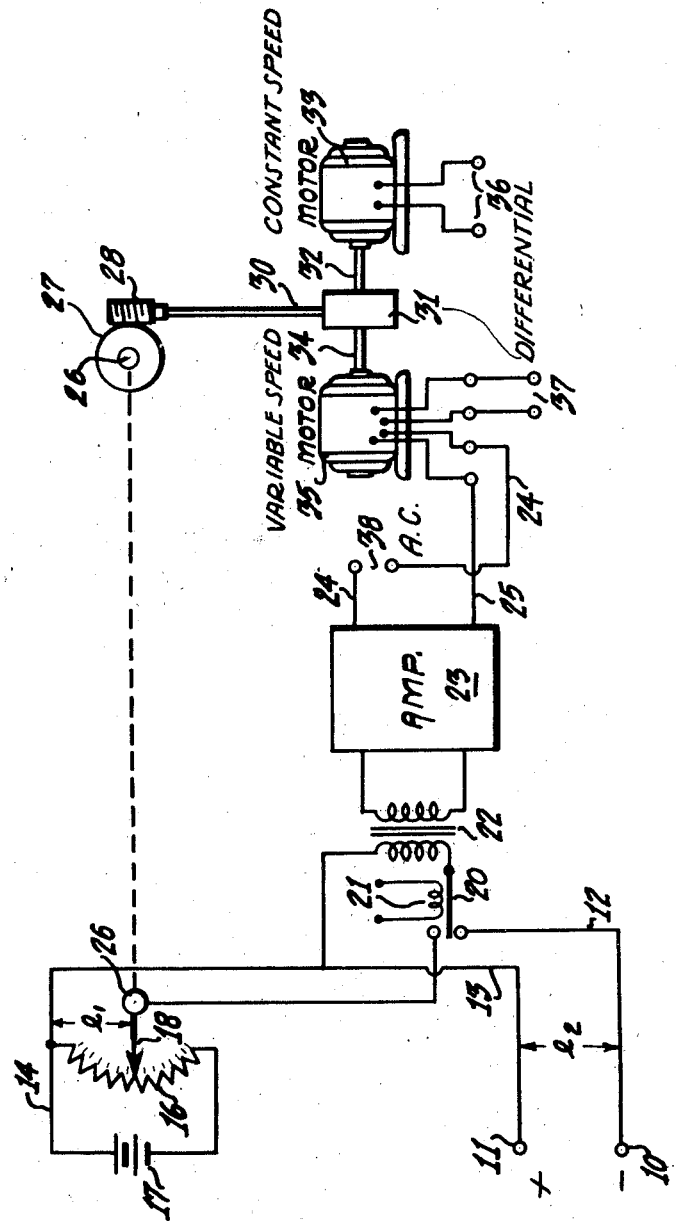
Inventor
HAROLD E. HAYNES
By
Attorney Patented June 3, 1947

2,421,560

UNITED STATES PATENT OFFICE 2,421,560

DIFFERENTIAL VOLTAGE CONTROL SYSTEM

Harold E. Haynes, Indianapolis, Ind., assignor to Radio Corporation of America, a corporation of Delaware Application September 3, 1943, Serial No. 501,094

8 Claims. (Cl. 171—95)

The present invention relates to control apparatus and more particularly to the actuation of a movable element according to the variations of a control voltage.

In devices of this character it has heretofore been proposed to operate the pointer of a potentiometer through the medium of an electric motor driven by a current controlled by the amplitude of a varying alternating voltage. The desired result is to cause the pointer to follow the voltage variations in such a precise manner as to be a measure thereof. In this attempt the motor was directly connected to the pointer mechanism so that accuracy of pointer position depended solely upon the proper functioning of the motor, particularly with respect to speed requirements. Thus, the slow motor speed necessary to cause the potentiometer pointer to follow smoothly slow variations in voltage requires such a high gear ratio that the motor is unable to speed up proportionately to meet the higher speed corresponding to very rapid voltage changes. In other words, the motor cannot pick-up fast enough to follow the maximum rate of change of the voltage measured. This may be due to friction, locking at standstill and other factors which make the action of a small motor very unreliable at low speeds and consequently its ratio of maximum to minimum usable speed too small for efficient operation in a device of the type here under consideration.

Some of the objects of the present invention are: to provide an improved system for measuring variations of voltage; to provide a system having a wide range of usable speeds; to provide a control system which will follow very slow variations in the control voltage smoothly while also being able to move very rapidly when necessary; to provide means for controlling the position of a pointer or other movable element by the amplitude of a varying alternating voltage; to provide a control system wherein the operating means is continuously running at a relatively high speed to thereby overcome the disadvantages of bringing a motor up to speed from a standstill; to provide a system wherein the pointer of a potentiometer serves as a measure of a varying voltage; to provide a control system wherein the shaft of the movable element is always turned at speeds corresponding to the amplifier output voltage; to provide a motor control system having a very high ratio of maximum to minimum speed; and to provide other improvements as will hereinafter appear.

In the accompanying drawing the figure is a diagrammatic showing of a system embodying one form of the present invention.

Referring to the drawings, one form of the present invention consists of terminals 10 and 11 of potentials shown forming the output of the varying direct current voltage $e_2$ to be measured, this voltage being obtained in this instance by rectifying the varying alternating current which may be control tone of a sound reproducing system or any suitable source of control current. The input conductors 12 and 13, respectively leading from the terminals 10 and 11, are associated with a circuit including conductors 14 and 15, a potentiometer 16 and source of direct current reference voltage 17, in such a manner that the difference between the voltage $e_2$ and the direct current voltage $e_1$, (which latter depends for its value on the setting of the potentiometer 16) has a phase controlling a novel motor assembly to turn the slide contact pointer 18 of the potentiometer 16 in the direction to reduce the difference between $e_2$ and $e_1$. The position of the pointer 18, thus, is a measure of the variable voltage $e_2$. A suitable scale calibrated in terms of voltage may desirably be provided in cooperative relation with the pointer 18.

In order to supply energy to the pointer operating means, the direct current voltage $e_2-e_1$ is converted to alternating current of line frequency by a vibrating contactor 20 energized by a source 21 of alternating current. The circuit of the converted current is coupled by a transformer 22 to an amplifying unit 23 having output conductors 24 and 25. For swinging the pointer 18 according to voltage variations, its shaft 26 in the present instance has a worm wheel 27 keyed thereon and meshing with a worm 28 on a driven shaft 30. The shaft 30 is actuated by any suitable type of bevel or spiral differential gearing 31, wherein one gear is driven by a shaft 32 of a motor 33, and another gear is driven by a shaft 34 of a second motor 35. The first motor 33 is a constant speed motor energized by a source 36 of alternating current, while the second motor 35 is a variable speed motor, such as a separately excited commutator motor, wherein a source 37 of alternating current is the separately exciting medium while the armature current is supplied by the amplified $e_2-e_1$ current by way of the conductors 24 and 25. By this construction the shaft 26 of the potentiometer pointer, or other movable element, turns at a speed which is the difference between the two motor speeds. Thus, as the amplifier output varies, the speed of the motor 35 varies above and below that of the motor 33 thereby causing the shaft 26 to turn at speeds corresponding to the amplifier output voltage but with neither motor operating at low speed at any time. Hence, the shaft 26 can turn smoothly at as low a speed as desired, and a very high ratio of maximum to minimum speed can be obtained.

For the purpose of causing the motor 35 to operate at the same speed as the motor 33 when the amplifier output is zero, so that zero speed of the potentiometer shaft 26 will coincide substantially with zero amplifier output, a fixed A. C. voltage 38 is applied in series with the amplifier output, being here shown as in conductor 24. This selected voltage value may be subject to minor changes due to changes in friction or winding resistances, but this error results only in a slight position error in the potentiometer, which error becomes smaller as the gain of the amplifying unit is increased.

From the foregoing it will be apparent that if the vibrating contactor 20 moves instantly from one contact to the other, and if $e_1$ is equal to $e_2$, then the voltage appearing between the contactor 20 and the conductors 11 and 14 will be constant and unvarying; therefore, since the transformer 22 can transmit only alternating voltages, the amplifier input voltage will be zero. Now, if $e_1$ is slightly greater than $e_2$ the voltage appearing between the contactor 20 and the conductors 11 and 14 will be square wave with a peak-to-peak amplitude equal to the difference between $e_1$ and $e_2$. If the contactor does not operate instantaneously, then the voltage across the primary of transformer 22 will drop to zero twice during each cycle, but this voltage will contain only even harmonics of the line frequency and hence when amplified will not contribute torque to the motor 15.

The voltage 38 is of line frequency and hence the sum of the amplifier output and the voltage 38 will be greater or less than the amplifier output voltage, depending upon whether the amplifier output is of the same or opposite phase as the voltage 38. The voltage 38 may be considered as merely an A.-C. bias to make the motor 35 operate at approximately the same speed as motor 33 in the absence of any amplifier output.

In operation of the system, assuming the amplifier output to be zero, the motor 33 will drive its shaft 32 at a selected speed and the motor 35, by reason of the supplied fixed voltage 38, will drive its shaft 34 at the same selected speed, and by reason of the differential unit 31, no motion will be imparted to the shaft 30 and the speed of the potentiometer shaft 26 will be zero. Assuming now that the controlling voltage or the variable voltage to be measured is delivered to the terminals 10 and 11, and that the fixed voltage circuit including circuits of the reference voltage and of the potentiometer are closed, the difference between the voltages $e_2$ and $e_1$ will be translated through the vibrator 20 and reach the output conductors 24 and 25 as an amplified voltage difference, which is either additive to or subtractive from the fixed voltage 38 in series with the output to vary the speed of the motor 35 in strict accordance with the aforesaid voltage difference. Hence, the shaft 30 turns to operate the potentiometer shaft 26 in the proper direction to indicate the value of the voltage difference, and therefore, serves as a measure of the voltage $e_2$.

What is claimed is:

1. A control system consisting of the combination of a potentiometer having a movable indicating element, means for varying the position of said element including a differential gearing, a constant speed electric motor connected to said gearing, and a variable speed electric motor connected to said gearing, a source of varying voltage to be measured, a source of fixed voltage for equalizing the speed of said variable motor with the speed of said constant speed motor, a circuit including a source of reference voltage and said potentiometer, and means controlling the speed of said variable speed motor by the difference between said reference voltage and said variable voltage, whereby said indicating element moves as a function of said difference.

2. A control system consisting of the combination of a potentiometer having a movable indicating element, means for varying the position of said element including a differential gearing, a constant speed electric motor connected to said gearing, and a variable speed electric motor connected to said gearing, means for driving said variable speed motor at the same speed as said constant speed motor, a source of varying voltage, a circuit including a source of reference voltage and said potentiometer, and means associated with said variable speed motor for changing the speed thereof in accordance with differences between said reference voltage and said varying voltage, whereby said indicating element moves in synchronism with variations of said differences.

3. A control system consisting of the combination of a potentiometer, a slide contact pointer therefor, means including two electrical power units for driving said pointer, a circuit including said potentiometer and a source of reference voltage, a source of varying voltage, means equalizing the speed of said power units when the difference between said voltages is zero to maintain said pointer in a null position, and means operated by a difference between said voltages to create an unbalance between said power units whereby said pointer moves in synchronism with variations of said difference.

4. A control system consisting of the combination of a potentiometer, a slide contact pointer therefor, means for moving said pointer including a differential gearing, a constant speed electric motor connected to said gearing, and a variable speed electric motor connected to said gearing, a source of alternating current having a value to drive said variable speed motor at the same speed as said constant speed motor to maintain said pointed in a zero position, a circuit including said potentiometer and a source of reference voltage, a source of variable voltage, and means to impress any difference between said variable voltage and said reference voltage upon said alternating current to change the speed of said variable speed motor to cause said pointer to move in synchronism with said difference.

5. In a control, a pair of electric motors, including a differential coupling therebetween, indicating means positionable by the differential running of the respective motors, means for continuously running both motors, a source of current, means responsive to a fluctuation of amplitude of said current for securing a differential running of said motors such as to actuate the indicating means to a position comprising a function of the amplitude of said current, and means operable when the indicating means attains the proper setting for representing such function for obviating the differential running and securing similar running of the respective motors to hold the indicating means in its new setting.

6. In a control, means positionable to indicate the amplitude of a current, a source of current of variable amplitude, the amplitude of which is to be constantly determined, a pair of electric motors, means for running the motors at the same speed when the indicating means is positioned to obtain a predetermined amplitude of said current, means for securing differential running of said motors pursuant to a fluctuation of said amplitude, means operatively associated with the respective motors for changing the position of the indicating means as a function of such differential running of the respective motors, and means for running the motors at the same speed to stop the movement of the indicating means when the latter has attained a new setting representative of the new amplitude of said current.

7. In a control, a source of A. C. current of varying amplitude, whose amplitude is to be indicated, a potentiometer including a reference potential source, a pair of electric motors, means for initially running said motors at the same speed, a differential gearing operably associated with the motors, means coupling the potentiometer to the gearing for holding the set position of the potentiometer during such similar running of the motors, an amplifying unit operably associated with the source of A. C. and with the potentiometer for producing an output whenever the value of the current from the A. C. source and of the reference current from the potentiometer are different, means making such amplifier output effective to vary the speed of one motor relative to the other and thus to change the position of the potentiometer to equalize the value of the source and the potentiometer and to stop the output of the amplifier unit with the potentiometer in a new setting representative of the changed amplitude of said source.

8. A control system consisting of the combination of a potentiometer having a slide contact pointer, means including two power electrical units for moving said pointer, means including a source of fixed voltage for normally equalizing the speed of said power units to maintain said pointer in an indicating position, a circuit including a source of voltage and said potentiometer, a source of varying voltage to be measured, and means operated by the difference between said varying voltage and the voltage controlled by said potentiometer to adjust said fixed voltage as a function of said difference whereby an unbalance between said power units is created to move said pointer in synchronism with the difference voltage.

HAROLD E. HAYNES.

REFERENCES CITED

The following references are of record in the file of this patent:

UNITED STATES PATENTS

| Number | Name | Date |
| --- | --- | --- |
| 2,114,330 | Borden | Apr. 19, 1938 |
| 2,113,164 | Williams, Jr. | Apr. 5, 1938 |
| 2,191,997 | Side | Feb. 27, 1940 |
| 2,203,689 | Macdonald | June 11, 1940 |
| 2,316,240 | Harrison | Apr. 13, 1943 |
| 2,335,163 | Smith | Nov. 23, 1943 |
| 1,077,725 | Kramer | Nov. 4, 1913 |
| 1,669,107 | Umansky | May 8, 1928 |
| 1,975,023 | Sertillange | Sept. 25, 1934 |
| 1,983,229 | Hillier et al. | Dec. 4, 1934 |
| 1,971,313 | Johnson | Aug. 21, 1934 |
| 2,302,049 | Parker et al. | Nov. 17, 1942 |

FOREIGN PATENTS

| Number | Country | Date |
| --- | --- | --- |
| 492,382 | France | Oct. 2, 1916 |
| 338,226 | Germany | June 15, 1921 |